United States Patent
Wang et al.

(10) Patent No.: US 10,383,032 B2
(45) Date of Patent: *Aug. 13, 2019

(54) METHOD AND DEVICE FOR AUTHENTICATION VIA USER BEHAVIOR IN MOBILE SCENARIOS

(71) Applicant: Alibaba Group Holding Limited, Grand Cayman (KY)

(72) Inventors: Sen Wang, Zhejiang (CN); Yunjiao Yao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,777

(22) Filed: Jan. 7, 2019

(65) Prior Publication Data

US 2019/0141608 A1 May 9, 2019

Related U.S. Application Data

(63) Continuation of application No. 15/445,843, filed on Feb. 28, 2017, now Pat. No. 10,212,644, which is a
(Continued)

(30) Foreign Application Priority Data

Sep. 1, 2014 (CN) .......................... 2014 1 0441814

(51) Int. Cl.
*H04W 48/04* (2009.01)
*G06F 21/31* (2013.01)
(Continued)

(52) U.S. Cl.
CPC .......... *H04W 48/04* (2013.01); *G06F 21/316* (2013.01); *H04B 7/043* (2013.01); *H04B 7/0413* (2013.01);
(Continued)

(58) Field of Classification Search
CPC ..... H04W 12/06; H04W 12/08; H04W 84/12; H04W 4/24; H04W 12/12; H04W 4/021;
(Continued)

(56) References Cited

U.S. PATENT DOCUMENTS 8,646,060 B1 2/2014 Ben Ayed
8,793,776 B1 7/2014 Jackson
(Continued)

FOREIGN PATENT DOCUMENTS

CN 102243771 A 11/2011
CN 102711035 A 10/2012
(Continued)

OTHER PUBLICATIONS

Translation of Chinese Office Action and Search Report from corresponding Chinese Patent Application No. 201410441814.9, dated Apr. 3, 2018, 9 pages.
(Continued)

*Primary Examiner* — Fred A Casca
(74) *Attorney, Agent, or Firm* — Lee & Hayes, P.C.

(57) ABSTRACT

Methods and devices of authentication via user behavior for use in a mobile device. The method may include initiating an authentication via user behavior for an application transaction process and suspending the application transaction process before the authentication is successful; acquiring the latest radio frame from a beacon and determining a distance parameter based on the radio frame after the authentication is initialized; determining whether a specified distance condition is satisfied for the beacon and the mobile device; and in response to a determination that the specified distance condition is satisfied for the beacon and the mobile device, determining that the authentication is successful and resuming the application transaction process that was suspended previously. The present disclosure can efficiently perform
(Continued)

user authentication via behavior, quickly achieve execution of the transaction process, and avoid an excessive manual operation, thus being applicable in a variety of offline interactive processes.

20 Claims, 6 Drawing Sheets

Related U.S. Application Data continuation of application No. PCT/CN2015/088211, filed on Aug. 27, 2015.

(51) Int. Cl.

| | | |
|---|---|---|
| H04W 64/00 | (2009.01) | |
| H04W 12/06 | (2009.01) | |
| H04L 29/08 | (2006.01) | |
| H04L 29/06 | (2006.01) | |
| H04B 17/318 | (2015.01) | |
| H04W 4/02 | (2018.01) | |
| H04L 9/32 | (2006.01) | |
| H04B 7/0413 | (2017.01) | |
| H04B 7/06 | (2006.01) | |
| H04B 7/0426 | (2017.01) | |

(52) U.S. Cl.
CPC ......... *H04B 7/0617* (2013.01); *H04B 17/318* (2015.01); *H04L 9/32* (2013.01); *H04L 63/107* (2013.01); *H04L 67/22* (2013.01); *H04W 4/02* (2013.01); *H04W 12/06* (2013.01); *H04W 64/006* (2013.01)

(58) Field of Classification Search
CPC ..... H04W 16/14; H04W 24/02; H04W 48/02; H04W 4/025; H04W 4/80; H04W 68/00; H04W 76/10; H04B 7/0417; H04B 7/0617
USPC ........... 455/411, 26.1, 405, 406; 705/44, 18; 726/4, 22
See application file for complete search history.

(56) References Cited

U.S. PATENT DOCUMENTS

| | | |
|---|---|---|
| 2003/0208386 A1 | 11/2003 | Brondrup |
| 2006/0234631 A1 | 10/2006 | Dieguez |
| 2012/0235812 A1 | 9/2012 | Maia et al. |
| 2017/0171795 A1 | 6/2017 | Wang et al. |

FOREIGN PATENT DOCUMENTS

| | | |
|---|---|---|
| CN | 202502546 U | 10/2012 |
| CN | 103325060 A | 9/2013 |
| CN | 103793833 A | 5/2014 |
| CN | 103874166 A | 6/2014 |
| CN | 103491539 A | 1/2017 |
| JP | 2013042266 | 2/2013 |
| JP | 5410632 A | 2/2014 |

OTHER PUBLICATIONS

The Extended European Search Report dated Mar. 15, 2018, for European Application No. 15838258.0, 9 pages.
Estel, et. al., "Feasibility of Bluetooth iBeacons for Indoor Localization", Digital Enterprise Computing 2015, Oct. 15, 2013, Retrieved from : URL:https://dl.gi.de/bitstream/handle/20.500.12116/2330/97.pdf?sequence=1 on Mar. 7, 2018, 12 pages.
Translation of International Search Report from corresponding PCT application No. PCT/CN2015/088211 dated Nov. 30, 2015, 2 pages.
Office action for U.S. Appl. No. 15/445,843, dated Jul. 10, 2018, Wang, "Method and device for authentication via user behavior in mobile scenarios", 14 pages.
Riva, et. al., "Progressive authentication: deciding when to authenticate on mobile phones", USENIX, Apr. 11, 2013, col. 7-col. 12, 16 pages.
Translation of Written Opinion from corresponding PCT application No. PCT/CN2015/088211 dated Nov. 30, 2015, 5 pages.
The Japanese Office Action dated Mar. 12, 2019, for Japanese Application No. 2017-511935, a counterpart foreign application of the U.S. Appl. No. 15/445,843, 5 pages.

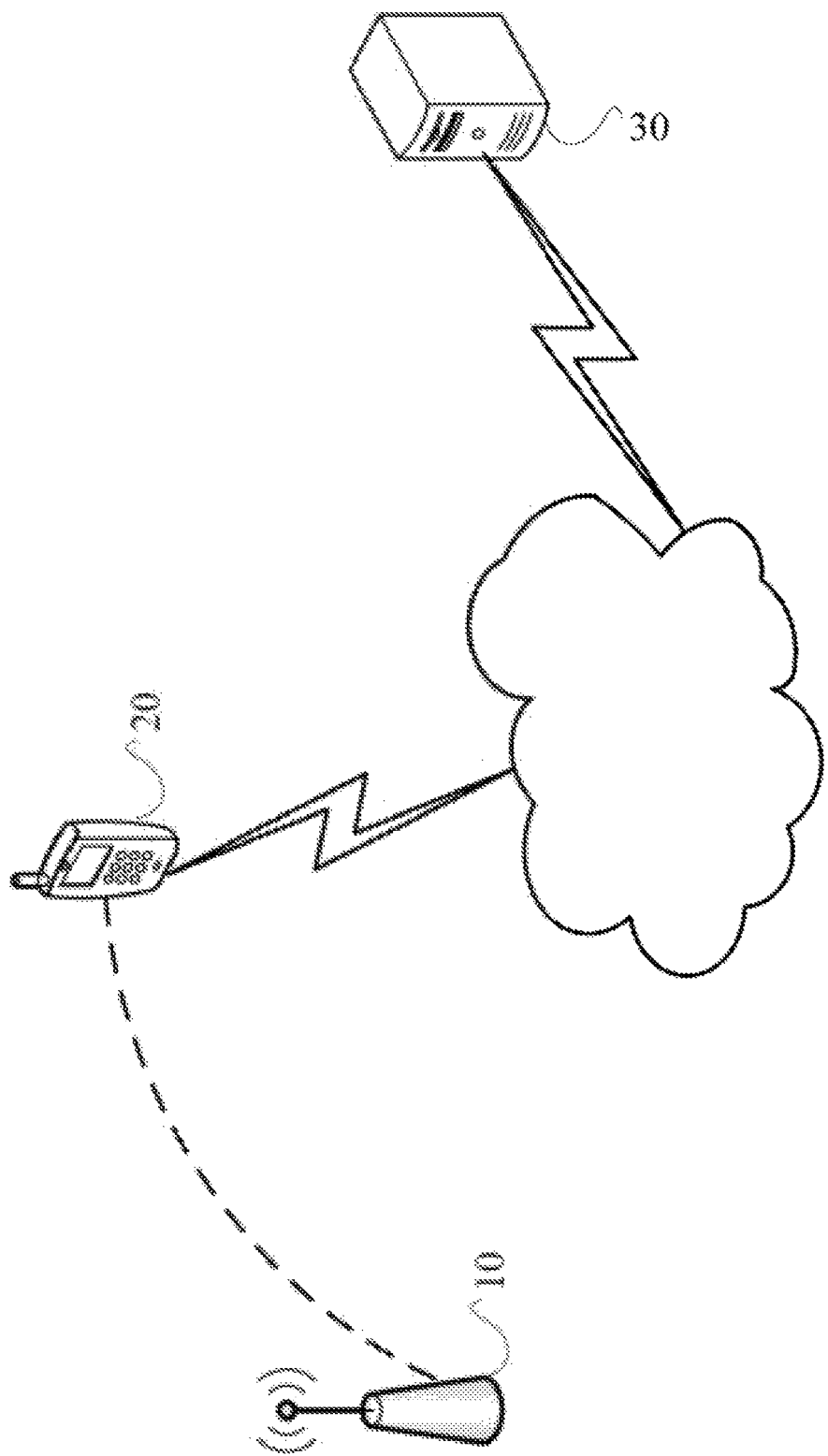

METHOD AND DEVICE FOR AUTHENTICATION VIA USER BEHAVIOR IN MOBILE SCENARIOS

CROSS REFERENCE TO RELATED PATENT APPLICATIONS

This application is a continuation of U.S. patent application Ser. No. 15/445,843, filed on 28 Feb. 2017, which claims priority to and is a continuation of International Patent Application No. PCT/CN2015/088211, filed on 27 Aug. 2015, which claims priority to Chinese Patent Application No. 201410441814.9, filed on 1 Sep. 2014, entitled "Method and device for authentication via user behavior in mobile scenarios," which are hereby incorporated by reference in their entirety.

TECHNICAL FIELD

The present disclosure relates to the field of network security technology, and particularly to a method and device for authentication via user behavior in mobile scenarios.

BACKGROUND

With the popularity of smartphones, tablet computers, and other portable devices, smart portable terminals have been deeply rooted in people's lives. People desire for more convenient work or life environments using mobile terminals, and particularly via a combination of online and offline technologies. During interactive processes, authentication via user behavior may be used to ensure the safety of the processes. On the other hand, people want the processes to become more convenient. Thus, developers are looking for more flexible and safer authentication solutions using user behavior for better user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Accordingly, the present disclosure provides a method of authentication via user behavior. The method is implemented by a mobile device. The method may include performing an authentication via user behavior for an application transaction process and suspending the application transaction process before the authentication is successful; acquiring the latest radio frame from a beacon and determining a distance parameter based on the radio frame after the authentication is initialized; determining whether a specified distance condition is satisfied for the beacon and the mobile device based on the distance parameter, and in response to a determination that the specified distance condition is satisfied for the beacon and the mobile device, determining that the authentication is successful and resuming the application transaction process that was suspended previously.

The present disclosure further provides a device for authentication via user behavior. The device is implemented by a mobile device. The device may include an application processing unit configured to perform an authentication via user behavior for an application transaction process and suspend the application transaction process before the authentication is successful; a data processing unit configured to acquire the latest radio frame from a beacon and determine a distance parameter based on the radio frame after the authentication is initialized; a distance authentication unit configured to determine whether a specified distance condition is satisfied for the beacon and the mobile device, where in response to a determination that the specified distance condition is satisfied for the beacon and the mobile device, the application processing unit determines that the authentication is successful and resumes the application transaction process that was suspended previously.

The present disclosure can perform user authentication via behavior conveniently, quickly achieve execution of the transaction process, and avoid excessive manual operations, thus being widely applicable in a variety of offline interactive processes.

BRIEF DESCRIPTION OF THE DRAWINGS

FIG. 1 is a diagram of an illustrative scheme that enables authentication via user behavior in accordance with implementations of the present disclosure.

DETAILED DESCRIPTION

The present disclosure provides a technical solution for convenient and safe authentication via user behavior. FIG. 1 shows a system which includes a beacon 10, a mobile terminal 20, and a server 30. In the present disclosure, the mobile terminal 20 may include a mobile phone, a tablet computer, a personal digital assistant and other mobile computing devices. A mobile phone is used as an example hereinafter for illustration. The beacon 10 may include a wireless beacon that supports a variety of short-range wireless technology. A relatively popular Bluetooth beacon is used as an example hereinafter for illustration.

Figure 2A:
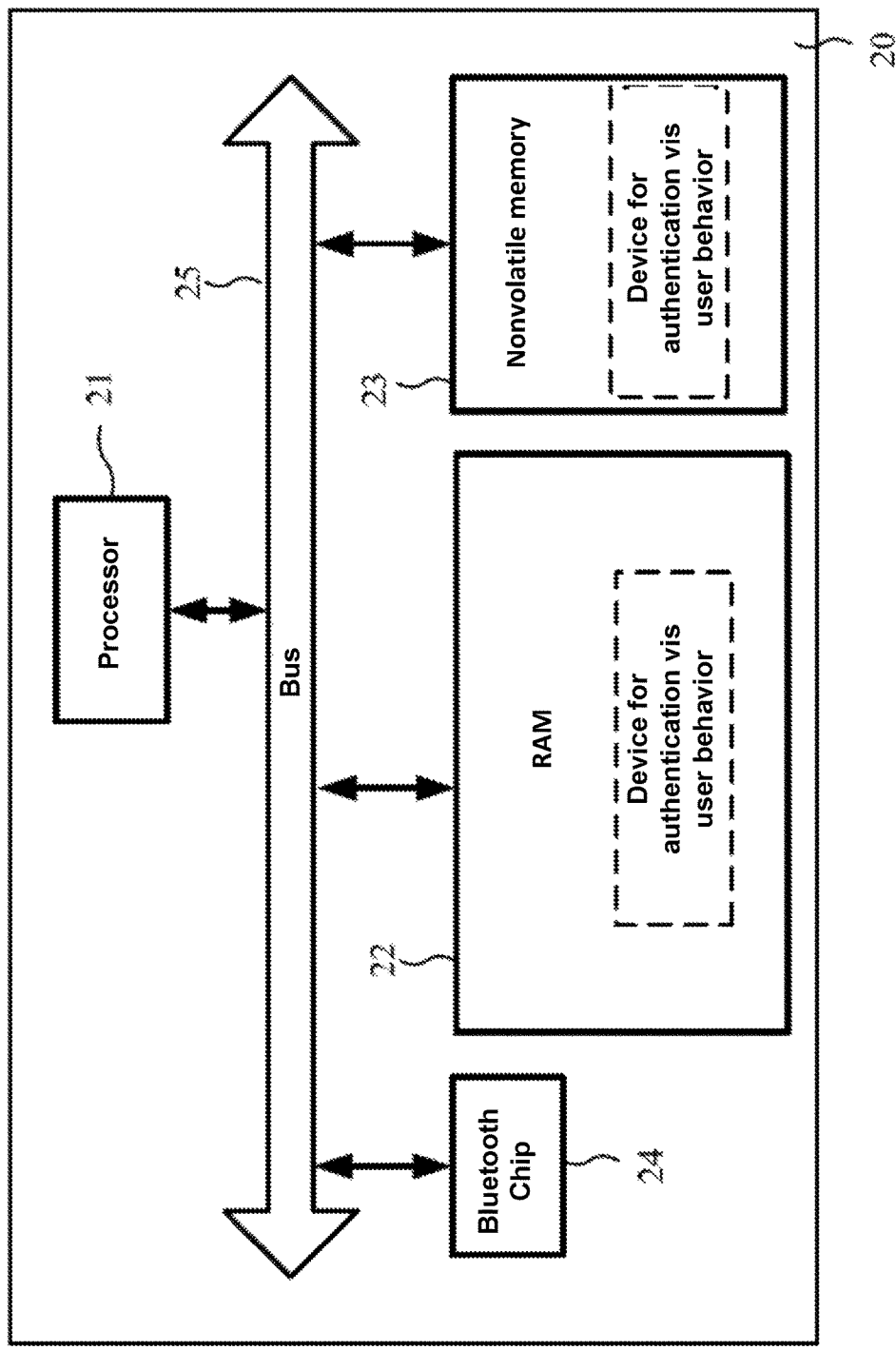
FIG. 2A is an example block diagram showing a hardware structure of a mobile terminal in accordance with implementations of the present disclosure.
Figure 2B:
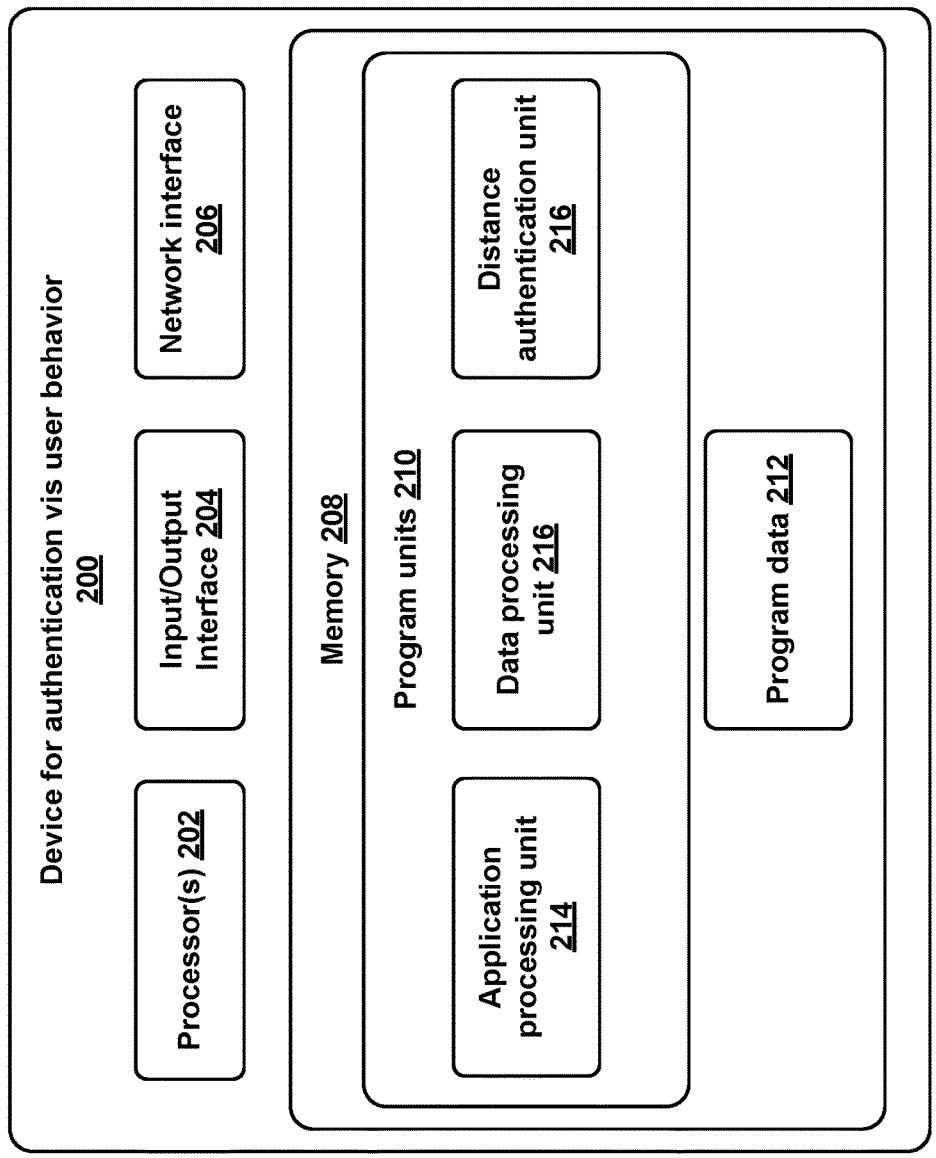
FIG. 2B is another example block diagram showing a logic structure of a device for authentication via user behavior in accordance with implementations of the present disclosure.

In implementations, the present disclosure provides a device for authentication via user behavior. The device may be implemented by the mobile device 20. As illustrated in FIGS. 2A and 2B, in implementations, the mobile phone 20 may include a processor 21, RAM 22, nonvolatile memory 23, a Bluetooth chip 24, and an internal bus 25. Apparently, the mobile phone 20 may further include various other hardware components. For simplicity of description, they are not repeated herein. In implementations, the device for authentication via user behavior may be implemented by computer software. Apparently, this does not preclude implementations using other techniques. The processor 21 may read computer instructions from the nonvolatile memory 23 to the RAM 22 and run the computer instructions. Then, a running result forms the device on a logical level.

In implementations, the device 200 for authentication via user behavior may include one or more processors 202, an input/output (I/O) interface 204, a network interface 206, and memory 208.

The memory 208 may include a form of computer-readable media, e.g., a non-permanent storage device, random-access memory (RAM) and/or a nonvolatile internal storage, such as read-only memory (ROM) or flash RAM. The memory 208 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

Figure 3:
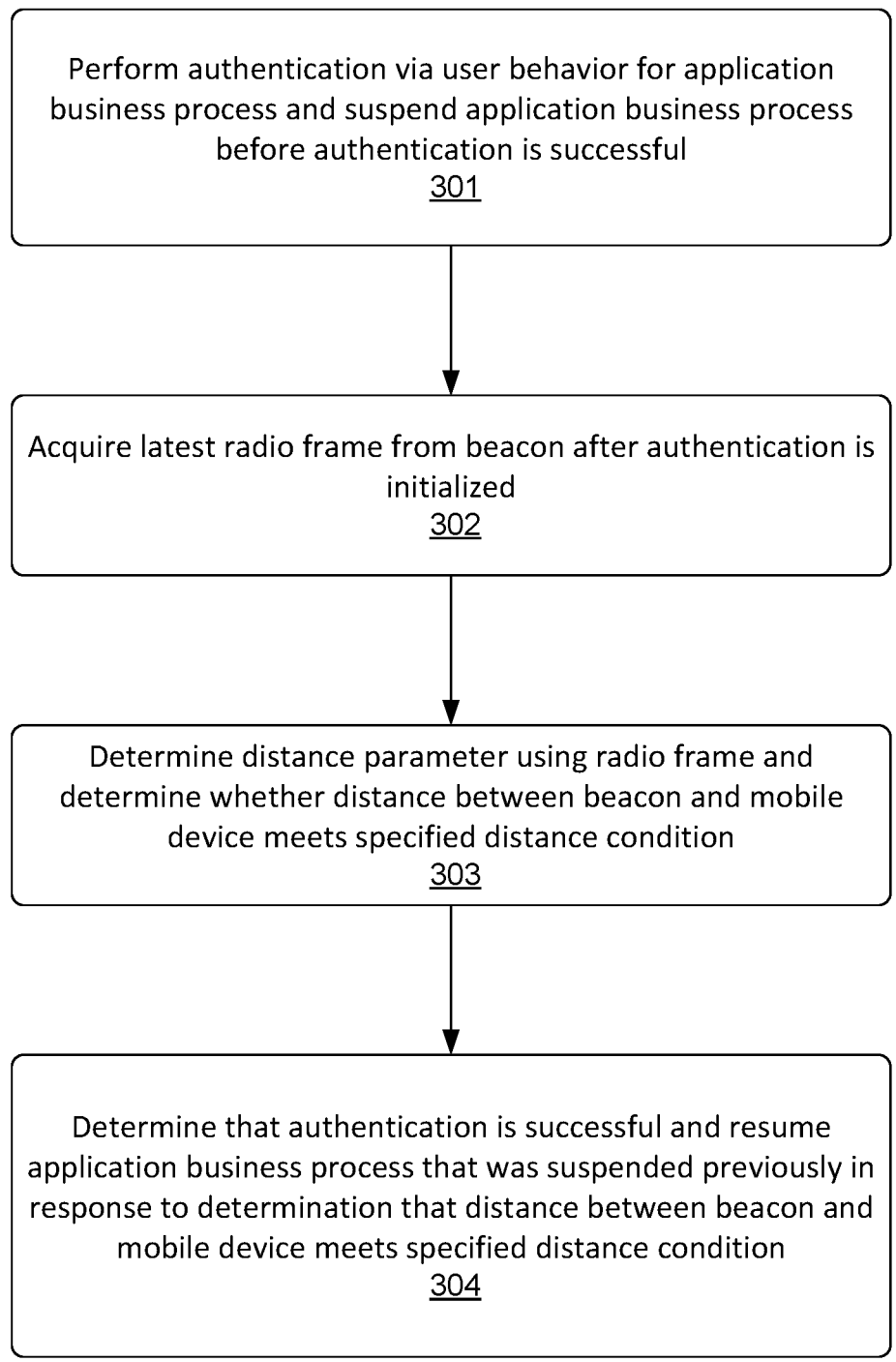
FIG. 3 is a flowchart of an illustrative process for authentication via user behavior in accordance with implementations of the present disclosure.

In implementations, the memory 208 may include program units 210 and program 212. The program unit 210 may include an application processing unit 214, a data processing unit 216, and a distance authentication unit 218. Referring to FIG. 3, operations implemented by the device 200 may include the following.

At step 301, the application processing unit 214 may perform the authentication via user behavior for an application transaction process and suspend the application transaction process before the authentication is successful.

At step 302, the data processing unit 216 may acquire the latest radio frame from the beacon and determine a distance parameter based on the radio frame after the authentication is initialized.

At step 303, the distance authentication unit 218 may determine whether a physical distance between the beacon and the mobile device meets a specified distance condition based on the distance parameter.

At step 304, the application processing unit 214 may determine that the authentication is successful and resume the application transaction process that was suspended previously in response to a determination that the specified distance condition is fulfilled.

Detailed implementations are provided below with respect to the technical solutions described above.

An owner of the Bluetooth beacon 10 may be a service provider (e.g., a unit or an individual). The owner may communicate with a user of the mobile terminal 20 via the Bluetooth beacon 10 in a convenient and secure manner. As an example, the owner of the Bluetooth beacon 10 is a hotel, and the Bluetooth beacon 10 is deployed in the hotel lobby, for example, at a position near the front desk. A user with the mobile terminal 20 may want to check into the hotel. According to hotel's regulations, the user generally has to register personal information. Currently, this registration is manually processed. For example, the user needs to show her/his identity card, and may also need to fill out some basic information. Hotel staffs need to scan the identity card to register the user and may input the basic information of the user. The whole process is relatively cumbersome and has low efficiency.

Figure 4:
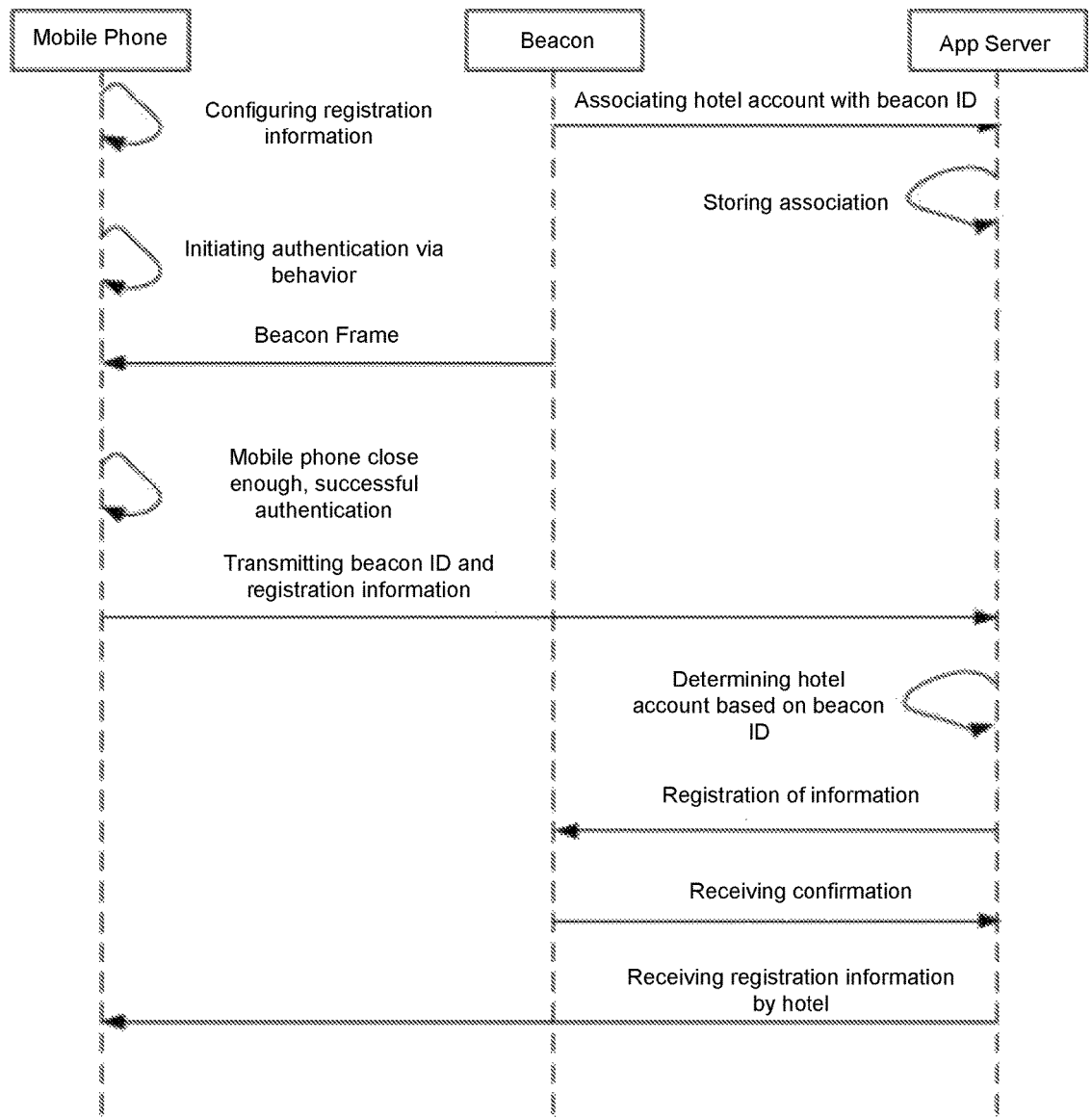
FIG. 4 is another flowchart of an illustrative process for authentication via user behavior in accordance with implementations of the present disclosure.

Referring to a process as illustrated in FIG. 4, in implementations, the user may efficiently check into the hotel using the mobile phone 20. To provide better user experience, the hotel and the user need to take some preparation work. For the hotel, the hotel may deploy the Bluetooth beacon 10 in an appropriate location (e.g., the front desk), and register an identity of the Bluetooth beacon 10 in an application server. For example, a hotel staff may install a client terminal on a computing device of the front desk, and the client terminal may communicate with the mobile phone 20. Suppose the name of the client terminal is "Check-in Hotel." The hotel may apply for a service account and transmit a corresponding relationship between the identity of the Bluetooth beacon 10 (which is abbreviated as "beacon identifier" hereinafter) and the service account to the application server. The application server may store the corresponding relationship for use in transactions generated in subsequent processes. For the mobile phone 20 of the user, the user may download a mobile App for registration from the application server. Suppose that the name of the mobile App is "Check-in." In these instances, the mobile App Check-in is an implementation of the device for authentication via user behavior. Before the user uses Check-in, the user may save various types of information required for hotel registration via a configuration interface of Check-in. For example, the information may include a scanned image (or photo) ID card, an ID number, a phone number, a place of work, a gender, a name, a title of an invoice, etc. The information may even include credit card information (used to complete a pre-authorized check-in).

After the above work is completed, the user with the mobile phone 20 may efficiently and safely check into the hotel. As mentioned earlier, the Bluetooth beacon 10 is deployed in the lobby near the front desk. To declare the existence, the Bluetooth beacon 10 may broadcast radio frames (e.g., beacon frames) in a predetermined frequency. When the user with the mobile phone 20 enters the lobby of the hotel, the mobile phone 20 may receive the beacon frame from the Bluetooth beacon 10. In the present disclosure, the mobile phone 20 may process the radio frames that the Bluetooth beacon 10 broadcasts.

As mentioned earlier, the user may check into the hotel using the mobile App Check-in. The user may click an icon of Check-in to initialize the mobile App and then select a function of "registration" to trigger authentication via user behavior. Before the authentication via user behavior is performed successfully, the mobile App Check-in may not transmit registration information of the user to other devices, which amounts to temporarily suspending the process of check-in operation, because the mobile App Check-in may not determine which hotel the user selects at the current stage. In other words, the mobile App Check-in may not know the other end of the transaction. In an exemplary embodiment, the mobile App may output on the interface a notification that the user is close to the Bluetooth beacon 10 to guide the user to place the mobile phone 20 near the Bluetooth beacon 10 in the lobby of the hotel. During the process that the user with the mobile phone 20 moves towards the Bluetooth beacon 10, operations from the step 302 to the step 304 may be executed in a loop until the check-in process is completed or timeout.

At step 302, the distance parameter may not necessarily be a physical distance parameter in a strict sense. In an exemplary embodiment, the distance parameter may be a received signal strength of the radio frame. Generally, the received signal strength may well indicate a physical distance between a receiver (i.e., the mobile phone 20) and a transmitter (i.e., the Bluetooth beacon 10). That is, the closer the distance between the transmitter and the receiver is, the stronger the received signal strength of the receiver is. By the same token, the specified distance condition may not necessarily be a condition indicating a real physical distance. Correspondingly, the specified distance condition may be a condition indicating a signal strength threshold. For example, the specified distance condition may refer to whether the received signal strength is greater than or equal to the specified signal strength. In other words, developers may obtain a specified signal strength from various experiments. The specified signal strength is generally relatively strong, which corresponds to a relatively short physical distance, such as 10 centimeters. When the received signal strength is greater than the specified signal strength, this indicates that the physical distance between the mobile phone 20 and the Bluetooth beacon 10 is less than or equal to 10 centimeters.

In some implementations, when the mobile phone 20 receives the latest Beacon frame, the mobile phone 20 may obtain the received signal strength of the radio frame (e.g., RSSI) via an internal Bluetooth component. When the received signal strength is greater than or equal to the specified signal strength, the step 303 may determine that the physical distance between the mobile phone 20 and the Bluetooth beacon 10 meets the specified distance condition. In contrast, when the received signal strength is less than the specified signal strength, this means that the physical distance between the mobile phone 20 and the Bluetooth beacon 10 fails to meets the specified distance condition. This indicates that the mobile phone 20 is not close enough to the Bluetooth beacon 10. The process will return to the step 302 to repeat the operation. Apparently, to avoid repeated cycles, a timer may be used to initiate a predetermined time period (e.g., 30 seconds) when the authentication via behavior is initiated. When the timer expires, the authentication will be terminated.

It is worth noting that, in the foregoing implementation, the specified distance condition is designed by developers according to actual needs to ensure that the user is close to the Bluetooth beacon 10 enough, which is a basis for whether the user is close enough to the Bluetooth beacon 10. When the user places the mobile phone 20 close enough to the Bluetooth beacon 10, from a standpoint of Check-in, its desire that the user's action of placing the mobile phone 20 close enough to the Bluetooth beacon 10 has been performed by the user who clearly indicates his/her desire to check in. At this point, Check-in may execute the application transaction process that was suspended previously and further communicate with the opposite end (i.e., "Check-in hotel") of a transaction corresponding to the beacon for transaction. In implementations, the beacon identifier of the Bluetooth beacon 10 may be further obtained from the beacon frame at step 303. When the application transaction process is processed, the beacon identifier and the pre-stored transaction information or transaction instructions may then be sent to the application server. The application server completes the application transaction process between the beacon and a transaction terminal corresponding to the beacon.

During further execution of the application transaction process in this implementation, Check-in may transmit the pre-stored information in the mobile phone 20 for the user registration to the application server, which may then transmit to a computing device of the hotel. Specifically, Check-in may transmit the information for the user registration and the beacon identifier of the Bluetooth beacon to the application server at the same time. The application server may determine a corresponding hotel account based on the beacon identifier, and then transmit the information for the user registration to the computing device of the hotel, which runs a hotel version of Check-in. The reception staff may obtain the information for user registration after the mobile phone of the user is scanned (i.e., placing the mobile phone 20 near the Bluetooth beacon 10), which may include the scanned images of ID cards. Thus, the registration of the user is prepared efficiently.

The hotel version of Check-in may return a confirmation message to the application server after receiving the information for user registration. The application server may transmit a message to the mobile phone 20 to notify the user that the information of user registration is transmitted successfully. Accordingly, the user may know that the information for user registration has been received by the hotel. The loop between the step 302 and the step 304 is then terminated. As illustrated from the above description, the user may provide registration information to check into the hotel using the application Check-in without any tedious manual operations. The reception staff may not perform tedious operations such as scanning ID cards and inputting the registration information. The implementation is a significant improvement with respect to cost and efficiency.

Figure 5:
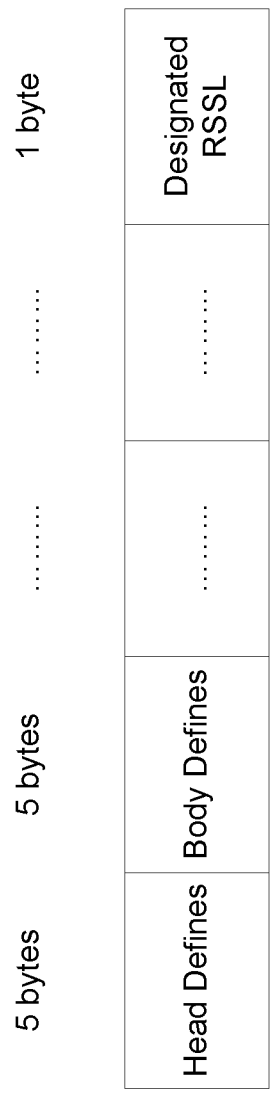
FIG. 5 is a diagram showing a structure of a radio frame in accordance with implementations of the present disclosure.

In the above example, the specified distance condition may be designed by developers of mobile applications. In some other implementations of the present disclosure, an implementation that can be more widely and easily adopted for various scenarios is provided. In these instances, the specified distance condition may refer to whether a received signal strength is greater than or equal to a specified signal strength. The specified signal strength refers to a signal strength obtained from a beacon frame at a specified location at the step 302. The specified signal strength is specified by a terminal associated with the beacon. Specified signal strengths of beacons with different specifications may be different in a location specified by a beacon frame. FIG. 5 is a diagram showing a format of a beacon frame in accordance with implementations of the present disclosure. The specified signal strength has a reserved position on the beacon frame and occupies a byte length. A corresponding signal strength may be input on this position, for example, 0x2B or 0x3C, and so on. An owner or a developer of the Bluetooth beacon 10 may perform configurations thereof based on needs.

This design apparently has a better universality. Bluetooth chips used by different Bluetooth beacons may be different, and may support different Bluetooth standards. Thus, a same signal strength may correspond to different receiving distances for different beacons. For example, a beacon A adopts a Bluetooth chip having a high transmitting power. Suppose that the received signal strength of the beacon A at 20 centimeters is X. Beacon B adopts a Bluetooth chip having a low transmitting power. Suppose that the received signal strength of the beacon B at 20 centimeters is 0.8X. Beacon C adopts a Bluetooth chip having a lower transmitting power. Suppose that the received signal strength of the beacon C at 20 centimeters is 0.7X. In the previous implementation, suppose that the specified signal strength is fixed at X. When the mobile phone 20 is close to the beacon A and the distance is 20 centimeters, the operation for scanning phones may succeed. However, when the mobile phone 20 is close to the beacon B or C and the distance is 20 centimeters, the operation for scanning phones cannot succeed. In these instances, the user may move the mobile phone closer to the beacon B or C to complete the operation for scanning phones. From another perspective, as for more short-range wireless technologies (e.g., ZigBee), power differences among different beacons are even greater. Thus, adoption of fixed specified signal strengths is generally not effective.

In these instances, beacons generate beacon frames with specified signal strengths. Thus, different specified signal strengths may be configured for different beacons. The specified signal strengths may be changed to achieve the same physical distance. Suppose that 10 centimeters are the distance that is generally accepted by users. Accordingly, the specified signal strength of beacon A is X, the specified signal strength of beacon B is 0.8X, and the specified signal strength of beacon C is 0.7X. This design is easily adopted to ensure good user experience with respect to scanning phones. No matter what kind of mobile phone is used and what kind of short-range wireless technology is adopted by the hotel, the user may complete the operation of scanning phones at a relative accurate distance.

The processing operations described above may be implemented by applications associated with mobile terminals. For example, a consumer may group-buy or other means to buy a movie ticket online. Currently, ticket sellers generally send an authentication code to the mobile phone 20 such that a user may get a ticket using the authentication code. For example, the authentication code is sent to a social network terminal (e.g., TradeManager) of the user. The user may get the ticket from cinema staffs after arriving at the cinema. The staff manually checks whether the authentication code is legitimate. Alternatively, the user may get the ticket using a ticket machine by entering the authentication code. Apparently, these methods are cumbersome since the length of the code is usually a dozen or more. Based on the technical aspect of the present disclosure, developers of TradeManager may consider the design of Check-in and develop a simple ticket function to help users to get tickets efficiently.

Like the previous implementation, the Bluetooth beacon 10 may be deployed next to the ticket machine. The relationship between the beacon identifier of the beacon and the ID of the ticket machine is bound in the application server. TradeManager may be modified to add a ticket function for the user. The user selects the authentication code to initiate the function and authentication via user behavior. The transaction process is suspended until the user successfully gets the ticket. The operations 302 to 304 may be executed. After the authentication is successful, TradeManager may continue to execute the ticket operation. TradeManager may proceed the transaction interaction with the ticket machine via the application server. During the interaction for the translation, TradeManager may transmit the beacon identifier of the Bluetooth beacon 10 and the authentication code stored in TradeManager to the application server, and the application server may identify the ticket machine based on the beacon identifier and transmit the authentication code to the ticket machine. The ticket machine may verify the authentication code after receiving the authentication code. The ticket machine may further provide the ticket to the user after authentication is successful. Throughout the process, the user may get the ticket without inputting the authentication code.

In the previous examples, after the authentication is successful, subsequent interactions may include transmitting the transaction information stored on the mobile phone 20 to a corresponding terminal of the beacon (e.g., a computing device of the hotel or the ticket machine). Other applications may also be supported by the implementations of the present disclosure. Taking an example of Check-in, the registration information may further include information of a user account that the user registers on the application server. After the user is ready to leave the hotel, the user may pay bills using Check-in. In the process, the hotel staff may transmit the bill information corresponding to the user account to the application server, and the application server transmits the bill information to the mobile phone 20. After the user receives the bill and determines the bill is correct, the user may initiate the authentication via behavior and a payment process by selecting a function "Confirming Payment" of Check-in. The payment process is suspended until the user authentication is successful. Then, the operations 302 to 304 may be executed. In step 304, Check-in may proceed with the payment process if the authentication via behavior is successful. During this process, Check-in may transmit a confirmation message of the payment to the application server, and the confirmation message may include a serial number of the bill. The application server may proceed with the payment based on the confirmation message and notify results of the payment to parties of the current payment transaction. Unlike the previous implementations, in this implementation, a transaction instruction is transmitted with the beacon identifier, together with the transaction information that is transmitted in the previous implementations.

As can be seen from the above implementations, efficient authentication and external transaction interaction may be achieved. On the one hand, an object of the current transaction interaction is confirmed based on authentication via user behavior. On the other hand, authentication via user behavior enables the user to process application transactions more efficiently. This solution can be widely used in other areas. For example, when users apply for bank cards or membership cards, operations similar to those described above may enable the user to complete the registration of personal information quickly.

The foregoing is only preferred implementations of the present disclosure only, and it is not intended to limit the present application. Within the theories and principles of the present disclosure, any modifications, equivalent replacement, or improvement are also within the scope of protection of the present disclosure.

What is claimed is:

1. A method comprising:
   under control of one or more processors of a mobile device,
   initiating an authentication via user behavior for an application transaction process and suspending the application transaction process before the authentication is successful;
   acquiring a latest radio frame from a beacon and determining a distance parameter based on the radio frame after the authentication is initialized;
   determining whether a specified distance condition is satisfied for the beacon and the mobile device; and
   in response to a determination that the specified distance condition for the beacon and the mobile device is satisfied:
   determining that the authentication is successful, resuming the application transaction process that was suspended previously, and transmitting information to a server to enable the server to complete the application transaction process between the beacon and a transaction terminal corresponding to the beacon, wherein the information includes an identity of the beacon that is acquired from the radio frame, transaction information, and a transaction instruction that is pre-stored, wherein the transaction information includes information required for registration via a configuration interface of check-in.

2. The method of claim 1, wherein the distance parameter comprises a received signal strength, and the specified distance condition comprises whether the received signal strength is greater than or equal to a specified signal strength.

3. The method of claim 2, further comprising:
prior to the acquiring of the latest radio frame from the beacon after the authentication is initialized,
acquiring the specified signal strength from the radio frame in a specified location.

4. The method of claim 2, wherein a receiving distance corresponding to the received signal strength is not greater than 20 centimeters.

5. The method of claim 1, wherein the beacon includes a Bluetooth beacon, and the radio frame includes a beacon frame.

6. The method of claim 1, further comprising:
re-acquiring the latest radio frame from the beacon and continuing subsequent processing if the specified distance condition is not satisfied.

7. A device comprising:
one or more processors; and
memory coupled to the one or more processors, the memory storing thereon computer-readable instructions, executable by the one or more processors that when executed by the one or more processors, causes the one or more processors to perform acts including:
initiating an authentication via user behavior for an application transaction process, and suspend the application transaction process before the authentication is successful;
acquiring a latest radio frame from a beacon, and determine a distance parameter based on the radio frame after the authentication is initialized;
determining whether a specified distance condition is satisfied for the beacon and the mobile device;
in response to a determination that the specified distance condition for the beacon and the mobile device is satisfied:
determining that the authentication is successful,
resuming the application transaction process that was suspended previously, and
transmitting information to a server to enable the server to complete the application transaction process between the beacon and a transaction terminal corresponding to the beacon, wherein the information includes an identity of the beacon that is acquired from the radio frame, transaction information, and a transaction instruction that is pre-stored, wherein the transaction information includes information required for registration via a configuration interface of check-in.

8. The device of claim 7, wherein the distance parameter comprises a received signal strength, and the specified distance condition comprises whether the received signal strength is greater than or equal to a specified signal strength.

9. The device of claim 8, the acts further comprising:
prior to the acquiring of the latest radio frame from the beacon after the authentication is initialized, acquiring the specified signal strength from the radio frame in a specified location.

10. The device of claim 8, wherein a receiving distance corresponding to the received signal strength is not greater than 20 centimeters.

11. The device of claim 7, wherein the beacon includes a Bluetooth beacon, and the radio frame includes a beacon frame.

12. The device of claim 7, wherein the acts further comprising re-acquiring the latest radio frame from the beacon and continuing subsequent processing if the specified distance condition is not satisfied.

13. One or more computer-readable media storing executable instructions that, when executed by one or more processors, cause the one or more processors to perform acts comprising:
initiating an authentication via user behavior for an application transaction process and suspending the application transaction process before the authentication is successful;
acquiring a latest radio frame from a beacon and determining a distance parameter based on the radio frame after the authentication is initialized;
determining whether a specified distance condition is satisfied for the beacon and the mobile device; and
in response to a determination that the specified distance condition for the beacon and the mobile device is satisfied:
determining that the authentication is successful,
resuming the application transaction process that was suspended previously, and
transmitting information to a server to enable the server to complete the application transaction process between the beacon and a transaction terminal corresponding to the beacon, wherein the information includes an identity of the beacon that is acquired from the radio frame, transaction information, and a transaction instruction that is pre-stored, wherein the transaction information includes information required for registration via a configuration interface of check-in.

14. The one or more computer-readable media of claim 13, wherein the distance parameter comprises a received signal strength, and the specified distance condition comprises whether the received signal strength is greater than or equal to a specified signal strength.

15. The one or more computer-readable media of claim 14, the acts further comprising:
prior to the acquiring of the latest radio frame from the beacon after the authentication is initialized, acquiring the specified signal strength from the radio frame in a specified location.

16. The one or more computer-readable media of claim 13, wherein the beacon includes a Bluetooth beacon, and the radio frame includes a beacon frame.

17. The one or more computer-readable media of claim 13, the acts further comprising:
re-acquiring the latest radio frame from the beacon and continuing subsequent processing if the specified distance condition is not satisfied.

18. The method of claim 3, wherein different specified signal strengths are configured for different beacons.

19. The device of claim 9, wherein different specified signal strengths are configured for different beacons.

20. The one or more computer-readable media of claim 14, wherein a receiving distance corresponding to the received signal strength is not greater than 20 centimeters.

\* \* \* \* \*